CONVERTING SYSTEMS

Filed Oct. 23, 1959 3 Sheets-Sheet 1

| DECIMAL | TRUE BINARY | EXCESS THREE BINARY |
|---|---|---|
| 0 | 0000 | 0011 |
| 1 | 0001 | 0100 |
| 2 | 0010 | 0101 |
| 3 | 0011 | 0110 |
| 4 | 0100 | 0111 |
| 5 | 0101 | 1000 |
| 6 | 0110 | 1001 |
| 7 | 0111 | 1010 |
| 8 | 1000 | 1011 |
| 9 | 1001 | 1100 |

INVENTOR.
John T. Winkler
BY John V. Regan
ATTORNEY

Oct. 13, 1964 J. T. WINKLER 3,153,228

CONVERTING SYSTEMS

Filed Oct. 23, 1959 3 Sheets-Sheet 2

INVENTOR.
John T. Winkler
BY
John V. Regan
ATTORNEY

INVENTOR.
John T. Winkler
BY John V. Regan
ATTORNEY

United States Patent Office 3,153,228
Patented Oct. 13, 1964

3,153,228
CONVERTING SYSTEMS
John T. Winkler, Orlando, Fla., assignor to Radio Corporation of America, a corporation of Delaware
Filed Oct. 23, 1959, Ser. No. 848,381
13 Claims. (Cl. 340—347)

This invention relates generally to code translators, and more particularly to apparatus for the translation and selective readout of coded information.

Information handling machines are designed generally to manipulate information and perform calculations on information expressed in coded form. A number of different coding schemes are known and used in the art. In general, a given machine is adapted to handle information expressed in one particular code.

In some applications, it is desirable to transfer information between two or more machines having different code formats. It often is necessary to translate the transmitted information before it can be used in the receiver machine. By "translation" is meant the conversion of information expressed in one code to a representation of that information in a different code. Moreover, it is often necessary, for example, in the translation of multidigit decimal to binary coded decimal, to separate in point of time portions of the translated information. In the latter event, means for the selective readout of information is required in addition to the code translator.

It is an object of the present invention to provide a novel code translator and selective readout means.

It is another object of the present invention to provide a code translator and readout means which embodies a reduced number of components.

It is still another object of the present invention to provide a high speed code translator and storage arrangement.

Yet another object of the present invention is to provide a novel decimal to binary coded decimal translator and readout device.

In accordance with the present invention, a code converting network is provided having input and output terminals. Information characters expressed in a first code are connected to the input terminals so that each different character to be translated is applied to a different combination of one or more of the input terminals.

A plurality of bistable elements are provided for storing the information translated into a second code by the converting network. A plurality of current paths couple the bistable elements and the converting network. Energizing pulse signals are applied across the parallel current paths. Separate switching means in each of the current paths control the current flow therein in accordance with the output signal provided by the code converting network. The bistable elements may be reset selectively during the interval between successive energizing pulse signals. An important feature of the invention is the use of magnetic cores as the storage elements with a different core setting winding connected in each of the parallel circuits. Another feature of the invention is the sequential scanning of the storage elements to further convert the second code from parallel to serial form.

FIGURE 3 is a block diagram of a system for converting from multidigit decimal to binary coded decimal code.

Figures 1, 2:
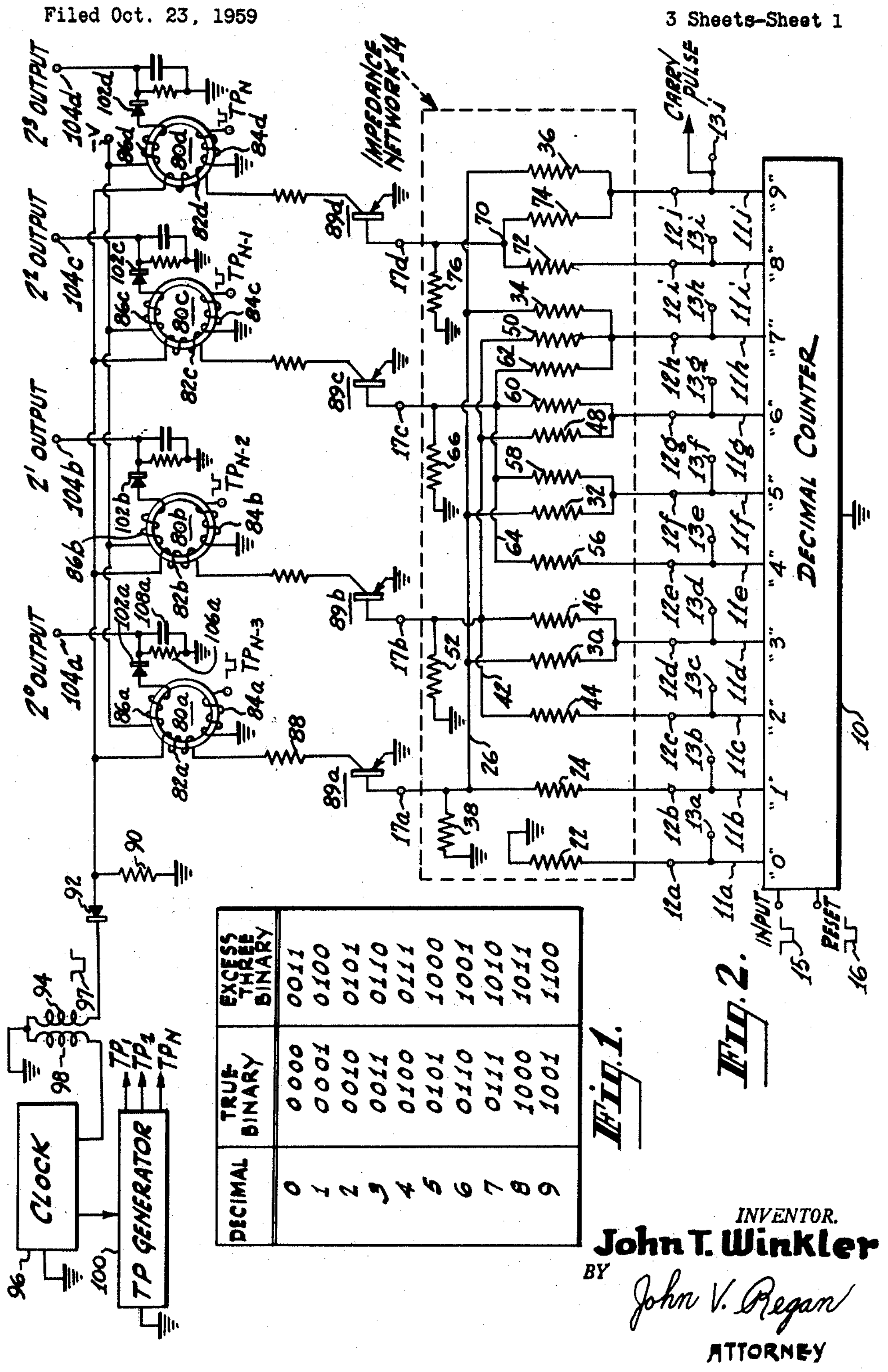
FIGURE 1 is a table relating decimal numerals to their counterparts in the "true" binary and "excess three" binary coded decimal systems.
FIGURE 2 is a schematic diagram of a decimal to true binary coded decimal translator and selected readout arrangement.
Figure 7:
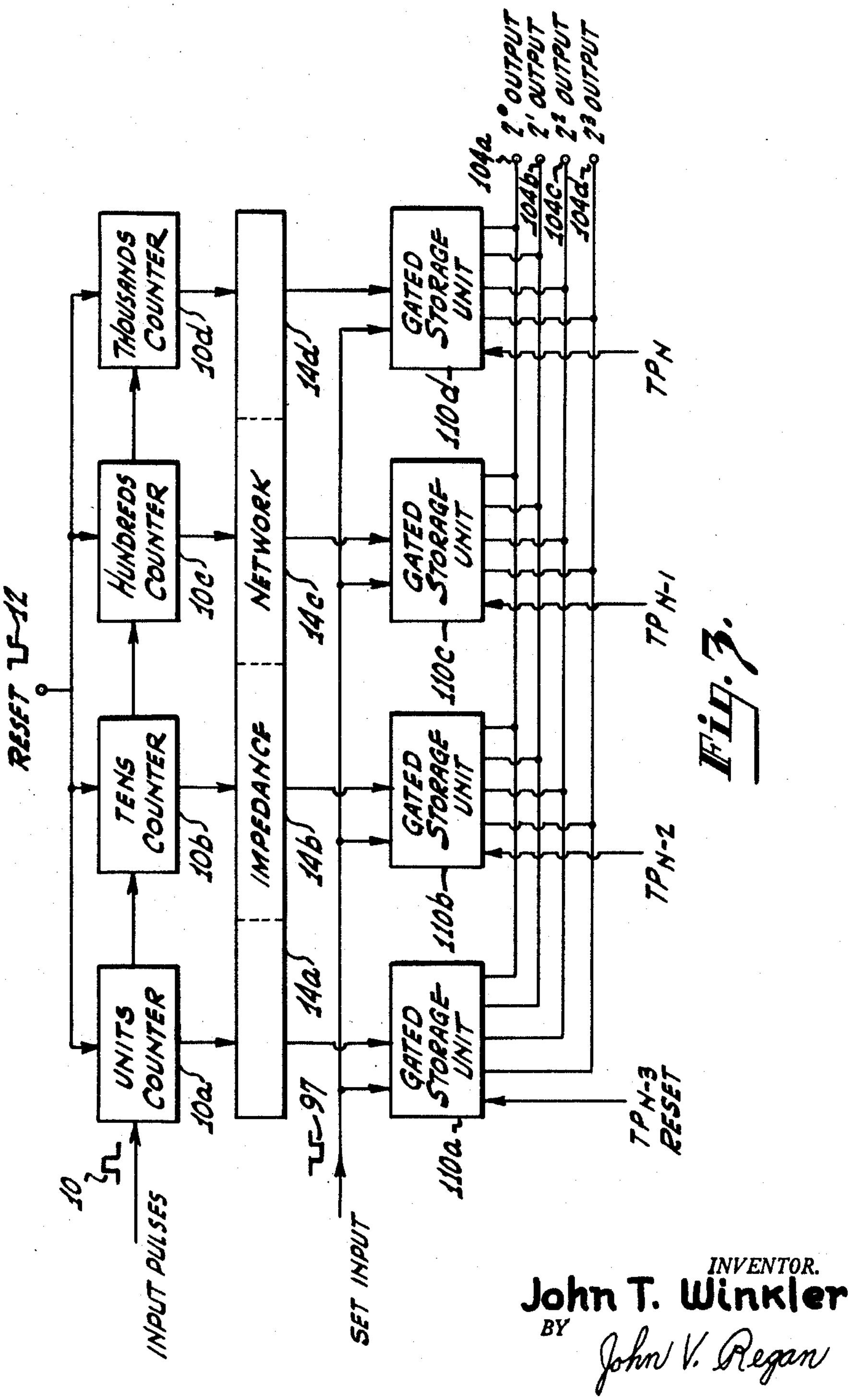

FIGURE 1 is a table of the decimal numerals 0–9 and the equivalents of these numerals in the "true" binary coded decimal and the "excess three" binary coded decimal systems. The binary digits or bits are arranged from right-to-left, and successive digital positions designate successively higher powers of two, beginning with $2^0$ in the least significant, or right-most, position. Multidigit decimal numerals may be represented in the binary system by a series of characters equal in number to the number of decimal positions. For example, the decimal numeral 24 has the true binary coded decimal equivalent 0010, 0101.

The bits of an individual character may occur either serially or in parallel, timewise. When translating from decimal to binary code in the former case, it is necessary to separate both the characters and the individual bits thereof in point of time. Only the characters need be separated timewise in the latter case.

A system according to the invention for translating from the decimal to the true binary coded decimal notation is exemplified in FIGURE 2. As will be apparent from the description which follows, the invention is also capable of translating between other codes. The input decimal information is shown for convenience as emanating from a decimal counter 10.

The outputs of the "0" through "9" stages of the counter 10 are applied over conducting leads 11_a_–11_j_, respectively, to terminals 12_a_–12_j_ and 13_a_–13_j_. The terminals 12_a_–12_j_ may be considered input terminals of the impedance network translator 14. The other terminals 13_a_–13_j_ are counter 10 output terminals to which may be connected external equipment (not shown), such as an indicator tube adapted to receive numerical information in decimal form. A carry pulse, derived at the output of the "9" stage when the counter switches from "9" to "0," may be used to trigger the succeeding counter of a cascaded chain (see FIGURE 3).

The counter 10 may be, for example, of the beam switching tube type. Such counters are known in the art and are described in general in the April 1956 edition of electronics, pages 122–126, and in other publications. When a beam switching tube is used as the active element of the counter 10, the conducting leads 11_a_–11_j_ preferably are connected directly to the "0"–"9" targets, respectively, of the tube.

Input pulses 15 to be counted are coupled to the grids of the switching tube in known fashion. Reset pulses 16 are applied to the spades of the tube at a desired time in the counting cycle to clear the counter tube and switch the electron beam to the "0" target. Only one stage of the counter 10 conducts current at any time because of the tube properties.

Decimal data appearing at the terminals 12_a_–12_j_ are translated in the impedance network 14 to the equivalent representation in true binary coded decimal form. The translated data appearing at the network output terminals 17a–17d are represented by the binary digits $2^0$–$2^3$, respectively, the lowest-order digit being entered in the left-most position as viewed in FIGURE 2. A resistor 22 is connected at one end to the first input terminal 12a and at the other end to a point of fixed reference potential, indicated schematically by the conventional symbol for circuit ground. The second input terminal 12b is connected through a resistor 24 to a bus 26. Resistors 30, 32, 34 and 36 connect the fourth, sixth, eighth and tenth input terminals, 12d, 12f, 12h and 12j, respectively, to the bus 26. The bus 26 connects directly to the $2^0$ output terminal 17a and is connected to ground through another resistor 38. Input terminals 12d and 12h are also connected to a second bus 42 by way of resistors 46, 50, respectively. The second bus 42 is connected to the input terminals 12c and 12g by resistors 44, 48, respectively; to ground through resistor 52; and directly to the $2^1$ output terminal 17b. Resistors 56, 58, 60 and 62 connect input terminals 12e–12h, respectively to a third bus 64. The third bus 64 connects directly to the $2^2$ output terminal 17c, and is returned to ground through a resistor 66. The remaining input terminal 12i is connected to a fourth bus 70 by a resistor 72. Also connected to this bus 70 by way of resistors 74, 76 are the tenth input terminal 12j and circuit ground, respectively. The fourth bus 70 connects directly to the $2^3$ output terminal 17d.

That portion of the FIGURE 2 circuit above the impedance network 14 provides selective sampling and storage of the translated data, and selected readout of the storage. Four bistable storage elements, illustrated as magnetic cores 80a–80d, provide interim storage for the time separation of the translated data. The core 80a and associated circuitry of the left most, or $2^0$, storage stage are representative of the other stages. Therefore, only this $2^0$ storage stage will be described in detail.

The core 80a is one having two magnetic directions of appreciable remanence. By "appreciable remanence" is meant a value of remanent flux equal to 50% or more of the value of saturation flux. For example, the core 80a may be of material having a substantially rectangular hysteresis characteristic, or material having a so-called 'S"-type characteristic. Magnetic materials such as molybdenum-Permalloy, manganese-magnesium zinc ferrite, and so forth are ones which exhibit the two directions of appreciable remanence. The core 80a has wound thereon a set winding 82a, a reset winding 84a, and an output winding 86a. The set winding 82a is connected at one end through a current limiting resistor 88 to the collector electrode of a pnp junction transistor 89a. The transistor 89a functions as a two input "and" gate, or switching means, as will be apparent hereinafter from a description of the circuit's operation. The emitter electrode of the transistor 89a is connected directly to ground, and the base electrode is connected to the $2^0$ output terminal 17a of the impedance network 14. The other end of the set winding 82a is returned by a resistor 90 to ground, and also through the series combination of a diode 92 and transformer secondary winding 94 to ground. Setting pulses from a clock pulse source 96 are applied across the transformer primary winding 98. The clock source 96 may be, for example, a free running multivibrator or other source of periodic pulses. The diode 92 prevents the collector-base diode of the transistor 89a from becoming forward biased. The shunt resistor 90 increases the band pass of the pulse input circuit and helps to shape the applied clock pulse 97.

The output of the clock source 96 is also applied to a timing pulse (TP), or sequence, generator 100. The generator 100 may be, by way of example, a tapped delay line. In any event, a series of spaced, negative pulses, designated $TP_1$–$TP_n$, are provided by the TP generator 100 in response to each applied clock pulse. Output $TP_1$ is the first occurring timing pulse of a series and may be the reset pulse 16 applied to the counter 2. Other negative timing pulses, as designated, are applied across the reset windings 84a–84d of the cores 80a–80d.

One end of the output winding 86a is connected to a source of negative biasing voltage, indicated as —V. The other end of the winding 86a is connected through a normally reverse-biased diode 102a to an output terminal 104a. The parallel combination of a resistor 106a and a capacitor 108a is connected from the output terminal 104a to ground. An output voltage is developed across resistor 106a. The capacitor 108a is added for output wave shaping purposes. A positive pulse appearing at the output terminal 104a represents a binary "one"; a binary "zero" is represented by the absence of a pulse.

Consider now the operation of the circuit of FIGURE 2, and assume that it is desired to sample periodically the state of the counter 10 and to translate the sampled data to the true binary coded decimal equivalent in serial form. Assume further that initially the decimal "0" stage of the counter 10 is conducting and that all other counter stages are cut off. The first applied input pulse 15 to be counted shifts conduction to decimal stage "1." Current (in the conventional sense) flows from ground through the circuit comprising resistor 38 and resistor 24, lead 11b and counter 10 to provide a negative voltage at the $2^0$ output terminal 17a. All other output terminals 17b–17d are substantially at zero potential because little or no current flows through the resistors 52, 66, 76, respectively.

The ninth stage of the counter 10 is triggered into conduction by the ninth occurring input pulse 15. Current flows from ground through the resistor 76, and through the series circuit comprising bus line 70 and resistor 74. Current also flows from ground through the circuit comprising resistor 38, bus line 26, and resistor 36. The resulting negative voltages at the network 14 output terminals 17a and 17d forward bias the emitter-base diodes of the corresponding transistors 89a and 89d, respectively. The magnitudes of these negative voltages are preferably sufficient to saturate the transistors 89a and 89d and, in any event, are sufficient to provide relatively low (in the order of a few ohms) collector-emitter impedance therein. The other transistors 89b, 89c exhibit relatively high (in the order of a megohm or more) collector-emitter impedance because their emitter base diodes are not forward biased.

A clock pulse 97 applied at this time results in heavy current flow through the set windings 82a and 82d of the first and fourth storage cores 80a and 80d and negligible current flow through the set winding 82b, 82c of the other cores 80b, 80c because of the transistor impedance conditions. The magnitude and direction of the heavy currents are such as to reverse the normally clockwise flux in, and provide counterclockwise flux saturation of, the cores 80a and 80d. These flux reversals induce voltages in the output windings 86a and 86d of the cores 80a and 80d, respectively. However, no outputs appear at the output terminals 104a and 104d because the polarity of these induced voltages is such, as to further reverse bias the diodes 102a and 102d. The other cores 80b and 80d remain saturated in the clockwise direction.

Negative pulses from the TP generator 100 are applied selectively in point of time to the reset windings 84a–84d. These reset pulses have a magnitude and polarity to drive the cores into flux saturation in the clockwise direction. The timing pulse $TP_{n-3}$ applied to the reset winding 84a of the first core 80a causes flux reversal therein because the flux in this core previously was set to saturation in the counterclockwise direction by the clock pulse 97. A large voltage pulse is induced in the corresponding output winding 86a due to the flux reversal from remanence in the set direction to saturation in the reset direction. This induced voltage pulse is of such amplitude and polarity that it forward biases the diode 102a and is passed to the output terminal 104a as a positive pulse.

The next timing pulse $TP_{n-2}$ is applied to the reset winding 84b of the second core 80b. The voltage developed in the corresponding output winding 86b is relatively small in magnitude because this core was not set by the clock pulse 97. The small voltage pulse induced in the output winding 86b due to a flux change from remanence to saturation in the reset direction is not sufficient in magnitude to overcome the reverse bias on the diode 102 provided by the bias source, —V. Similar conditions prevail in the third core 80c in response to the next timing pulse $TP_{n-1}$. The last timing pulse $TP_n$ is applied to the reset winding 84d of the fourth core 80d. A positive pulse appears at the output terminal 104d as a result of the large flux reversal.

It is thus seen that a decimal "9" is translated into true binary coded decimal form and read out serially as 1001. That this output is the true binary coded decimal equivalent of decimal "9" may be seen by referring to the table of FIGURE 1. Any other stored decimal numeral is translated in a similar manner.

In those cases wherein it is desired to clear and reset the counter 10 at each sampling, one of the TP generator 100 outputs, for example $TP_1$, may be applied as the reset pulse 16 to the counter 10.

FIGURE 3 is a block diagram of a system for translating multidigit decimal data to the binary coded decimal equivalent, and for selectively reading out the translated data, parallel by bit and serial by character. Those portions of FIGURE 3 which are similar to the circuit of FIGURE 2 are designated by like reference characters.

A plurality of decimal counters 10a–10d are connected in a cascade arrangement. Input pulses 15 to be counted are applied as trigger or shift pulses to the "units" counter 10a. The carry pulse from the "9" stage of the "units" counter 10a is applied as input to the "tens" counter 10b. A carry pulse is generated as the "units" counter 10a is shifted from "9" to "0." In like manner, the carry outputs of the "tens" counter 10b and "hundreds" counter 10c are applied, respectively, as inputs to the "hundreds" counter 10c and the "thousands" counter 10d.

The outputs of each counter 10a–10d are fed to a separate impedance translating network 14a–14d, respectively, of the type illustrated in FIGURE 2 and described previously. The outputs of each network 14a–14d are, in turn, fed to separate gated storage units 110a–110d, respectively. Each gated storage unit may include a set of bistable devices, such as the cores 80a–80d and associated circuitry illustrated in FIGURE 2, and a matching set of switching means, such as the transistors 89a–89d of FIGURE 2.

A set input pulse 97 is applied simultaneously to each gated storage unit to gate the translated equivalent of the sampled decimal data to interim storage in the cores. The data stored in the cores are read out selectively a character at a time by applying reset pulses in timed sequence to the gated storage units 110a–110d. Each reset pulse reads out and resets all cores simultaneously in the gated storage unit to which it is applied.

Consider, by way of example, that the decimal number 7318 is stored in the decimal counter 10a–10d. That is to say, the "units" counter 10a is storing decimal "8," the "tens" counter 10b is storing decimal "1," etc. A set pulse 97 applied at this time gates the outputs of the impedance networks 14a–14d to the gated storage units 110a–110d, respectively. Prior to the TP reset, or read out, pulses, each gated storage unit stores the true binary coded decimal equivalent of the decimal number sampled in the corresponding counter 10a–10d. By using impedance networks arranged differently from the type illustrated in FIGURE 2, other types of code translation are possible, for example "excess three" as described more fully hereinafter. The timing pulses $TP_{n-3}$–$TP_n$ serve to gate the coded characters in serial fashion. All of the storage elements (cores) of the first gated storage unit 110 are reset simultaneously by the $TP_{n-3}$ pulse. A pulse, indicating a binary "one," appears only at the output terminal 104d because this unit 110a stores the binary equivalent of decimal "8"; no output signals, indicating binary "zeroes" appear at the other terminals 104a, b, c.

The next timing pulse $TP_{n-2}$ simultaneously resets all storage elements in the second gated storage unit 110b. Information stored therein is gated in parallel to the output terminals 104a–104d and appears as a pulse on terminal 104a, corresponding to the binary number 0001.

The next timing pulse $TP_{n-1}$ simultaneously resets all storage elements in the third gated storage unit 110c. The binary number 0011 is gated in parallel to the output terminals 104a–104d. In like manner, the binary number 0111 appears in parallel at the output terminals in response to the last timing pulse $TP_n$.

Figure 4:
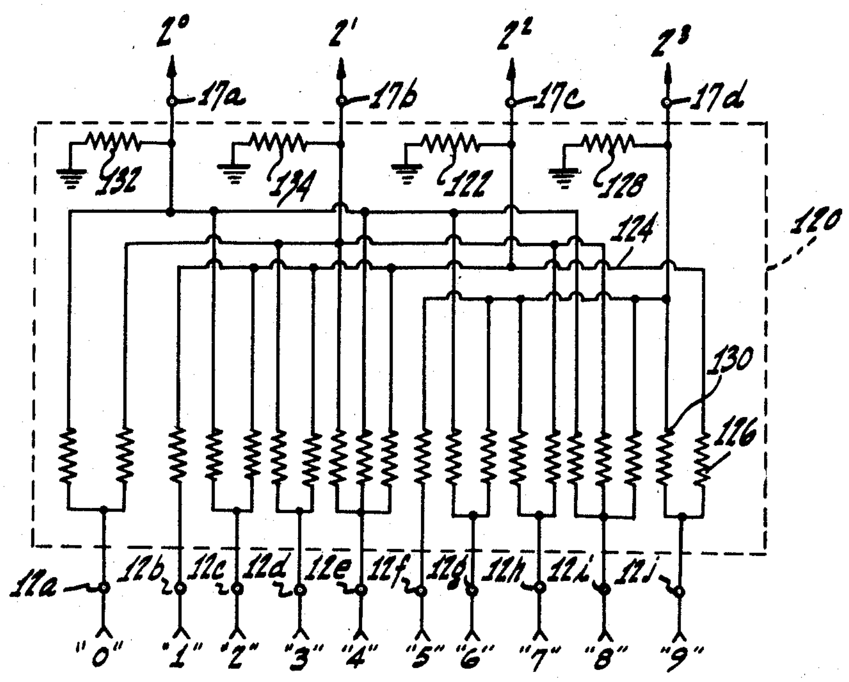
FIGURE 4 is a schematic diagram of an impedance network for translating decimal numerals to the excess three binary coded decimal code.

An impedance network 120 suitable for translating from decimal to "excess three" binary coded decimal is illustrated in FIGURE 4. The network input terminals 12a–12j and output terminals 17a–17d are designated by the same reference characters used in FIGURE 2 to indicate that this network 120 may be substituted for the network 14 of FIGURE 2 in those instances where translation from decimal to excess three binary coded decimal is desired. The network 120 is also a combinatorial resistor network generally similar to that of FIGURE 2. Therefore, it is believed unnecessary to describe the network 120 in detail. By tracing the network 120 circuits leading from the input terminals 12a–12j to reference ground, it may be seen that the binary outputs obtained when any input is energized correspond to those listed in the third column of the table of FIGURE 1.

By way of example, consider that the counter (not shown) is storing a decimal "9." Current flow from ground through the circuit comprising resistor 122, bus line 124, and resistor 126 to the counter provides a negative voltage at the $2^2$ output terminal 17c. A negative voltage also appears at the $2^3$ output terminal 17d as a result of current flowing from ground to the counter by way of the circuit comprising resistors 128 and 130. No outputs appear at the $2^0$ output terminal 17a and the $2^1$ output terminal 17b because little or no current flows through the associated resistors 132 and 134. The input character, decimal "9," thus appears at the output terminals as the binary number 1100. By reference to the third column of the FIGURE 1 table, it may be seen that this output is the "excess three" binary equivalent of the decimal "9."

What is claimed is:

1. The combination comprising: a code translator, said translator having input and output terminals, a source of coded signals connected to said input terminals, a plurality of bistable circuits each having a single set and a reset input, a single corresponding plurality of switching means each having a control input connected to a different one of said output terminals, and a source of energizing signals, each of said switching means being connected to control the application of said energizing signals to said set input of the corresponding one of said bistable circuits.

2. The combination comprising: a code translator, said translator having input and output terminals, a source of coded signals connected to said input terminals, a plurality of storage circuits each having a first stable state and a second stable state, a source of energizing signals, a plurality of switching means each having a control input connected to a different one of said output terminals, each of said switching means being connected to selectively apply said energizing signals for setting, to said first stable state, a different one of said storage circuits, and means for applying signals selectively to said storage circuits to reset all of said storage circuits to said second stable state.

3. A system for translating characters expressed in a first code to the equivalent representation in a second code and for selectively storing said equivalent representation comprising: a network of impedance elements having input terminals connected to receive said characters and output terminals presenting said equivalent representation, each of said input terminals being connected by certain ones of said impedance elements to a different combination of said output terminals, a set of storage elements equal in number to said output terminals, a source of energizing signals, and a corresponding set of "on-off" switches each connected in circuit with said energizing signal source and a corresponding one of said storage elements, each of said switching means having a control input connected to a different one of said output terminals.

4. A system for translating characters expressed in a first code to the equivalent representation in a second code and for selectively storing said equivalent representation comprising: a network of impedance elements having input terminals connected to receive said characters and output terminals presenting said equivalent representation, each of said input terminals being connected by certain ones of said impedance elements to a different combination of said output terminals, a source of energizing signals, a set of storage elements equal in number to said output terminals, a corresponding set of "on-off" switches each connected in circuit with said energizing signal source and a corresponding one of said storage elements, each of said switching means having a control input connected to a different one of said output terminals, and means for detecting selectively the states of said storage elements.

5. A system for translating characters expressed in a first code to the equivalent representation in a second code and for selectively storing said equivalent representation comprising a network of impedance elements having input terminals connected to receive said characters and output terminals presenting said equivalent representation, each of said input terminals being connected by certain ones of said impedance elements to a different combination of said output terminals, a plurality of magnetic cores each having a reset winding, a set winding and an output winding wound thereon, a source of energizing pulses connected to one end of each said set winding, a corresponding plurality of switching means each having a gated signal translating path connected to the other end of a respective said set winding and a control input for controlling the condition of said path, and means connecting each of said output terminals to a different said control input.

6. A system for translating characters expresed in a first code to the equivalent representation in a second code and for selectively sorting said equivalent representation comprising a network of impedance elements having input terminals connected to receive said characters and output terminals presenting said equivalent representation, each of said input terminals being connected by certain ones of said impedance elements to a different combination of said output terminals, a set of storage elements equal in number to said output terminals, a plurality of magnetic cores each having a reset winding, a set winding and an output winding wound thereon, a source of energizing pulses connected to one end of each said set winding, a corresponding plurality of switching means each having a gated signal translating path connected to the other end of a respective said set winding and a control input for controlling the condition of said path, means connecting each of said output terminals to a different said control input, and means for applying reset pulses to each said reset winding selectively.

7. The combination comprising: a code translator having input and output terminals, a source of coded signals connected to said input terminals, a plurality of storage elements, a corresponding plurality of semiconductor devices each having a control electrode and two other electrodes defining a signal translating path, a separate load impedance connected in series with each said path, each said control electrode being connected to a different one of said output terminals, a source of energizing signals connected to one of said other electrodes of each of said devices, and means connected in series with each said path for applying said signals to the input of a different one of said bistable elements.

8. The combination comprising: a network of impedance elements, said network having input and output terminals, each of said input terminals being connected by ones of said impedance elements to a different combination of said output terminals, a source of coded signals connected to said input terminal, a plurality of bistable storage elements, a corresponding plurality of semiconductor devices each having a control electrode and two other electrodes defining a signal translating path, a separate load impedance connected in series with each said signal translating path, each said control electrode being connected to a different one of said output terminals, a source of energizing signals connected to one of said other electrodes of each of said devices, means connected in series with each said path for applying said signals to the input of a different one of said bistable elements, and means for periodically and selectively reading out the states of said bistable elements.

9. A decimal counter having ten outputs each representing a different decimal digit, a code converting network having ten inputs and "$n$" outputs, "$n$" transistors each having a base electrode connected to a different one of said "$n$" network outputs and each having an emitter-collector current path, "$n$" storage elements, "$n$" parallel circuits each including a separate one of said emitter-collector paths and a separate one of said storage elements, and means for applying an energizing signal across all said parallel circuits.

10. A system comprising a first storage device having "$m$" outputs corresponding to the "$m$" positions of a first code, a converting network having "$m$" inputs and "$n$" outputs corresponding to the "$n$" positions of a second code, said first and second codes having a one-to-one correspondance, each of said first device outputs being connected to a different one of said network inputs, "$n$" gating circuits each having a control input and an output, "$n$" storage elements, "$n$" parallel circuits each including one of said gating circuit outputs and one of said storage elements, said "$n$" network outputs being connected respectively to said "$n$" control inputs, and means for applying an energizing signal across said "$n$" parallel circuit.

11. The combination comprising a code translator having input and output terminals, a source of coded signals connected to said input terminals, a plurality of bistable cores each having a setting winding and a reset winding, a corresponding plurality of gating devices each having a control electrode and two other electrodes defining a signal translating path, each said control electrode being connected to a different one of said output terminals, and a source of energizing voltage, each said signal translating path being serially connected with a different said setting winding across said energizing source.

12. The combination comprising a code translator having input and output terminals, a source of coded signals connected to said input terminals, a plurality of bistable cores each having a setting winding and a reset winding, a corresponding plurality of gating devices each having a control electrode and two other electrodes defining a signal translating path, each said control electrode being connected to a different one of said output terminals, and a source of pulses, each said signal translating path being serially connected with a different said setting winding across said pulse source.

13. The combination comprising a code translator having input and output terminals, a source of coded signals connected to said input terminals, a plurality of bistable cores each having a single setting winding and a reset winding, a corresponding plurality of gating devices each having a control electrode and two other electrodes defining a signal translating path, each said control electrode being connected to a different one of said output terminals, a source of energizing voltage, each said signal translating path being serially connected with a different said setting winding across said energizing source, and means for applying reset pulses to each said reset winding selectively.

References Cited in the file of this patent

UNITED STATES PATENTS 2,734,182 Rajchman ---------------- Feb. 7, 1956

2,758,788 Yaeger ---------------- Aug. 14, 1956

2,810,518 Dillon et al. ------------ Oct. 22, 1957

2,895,124 Harris ---------------- July 14, 1959

2,907,525 Hobbs ------------------ Oct. 6, 1959

2,917,727 Reach ----------------- Dec. 15, 1959

2,933,720 Newhouse et al. --------- Apr. 19, 1960

OTHER REFERENCES

"Digital Recorder Holds Data After Shock," by Charles P. Hedges, Electronics, March 20, 1959, pp. 60–62.

UNITED STATES PATENT OFFICE
CERTIFICATE OF CORRECTION

Patent No. 3,153,228 October 13, 1964

John T. Winkler

It is hereby certified that error appears in the above numbered patent requiring correction and that the said Letters Patent should read as corrected below.

Column 5, line 58, for "counter" read -- counters --; column 6, line 51, for "reset input, a single corresponding" read -- single reset input, a corresponding --.

Signed and sealed this 16th day of February 1965.

(SEAL)
Attest:

ERNEST W. SWIDER
Attesting Officer

EDWARD J. BRENNER
Commissioner of Patents